UNITED STATES PATENT OFFICE.

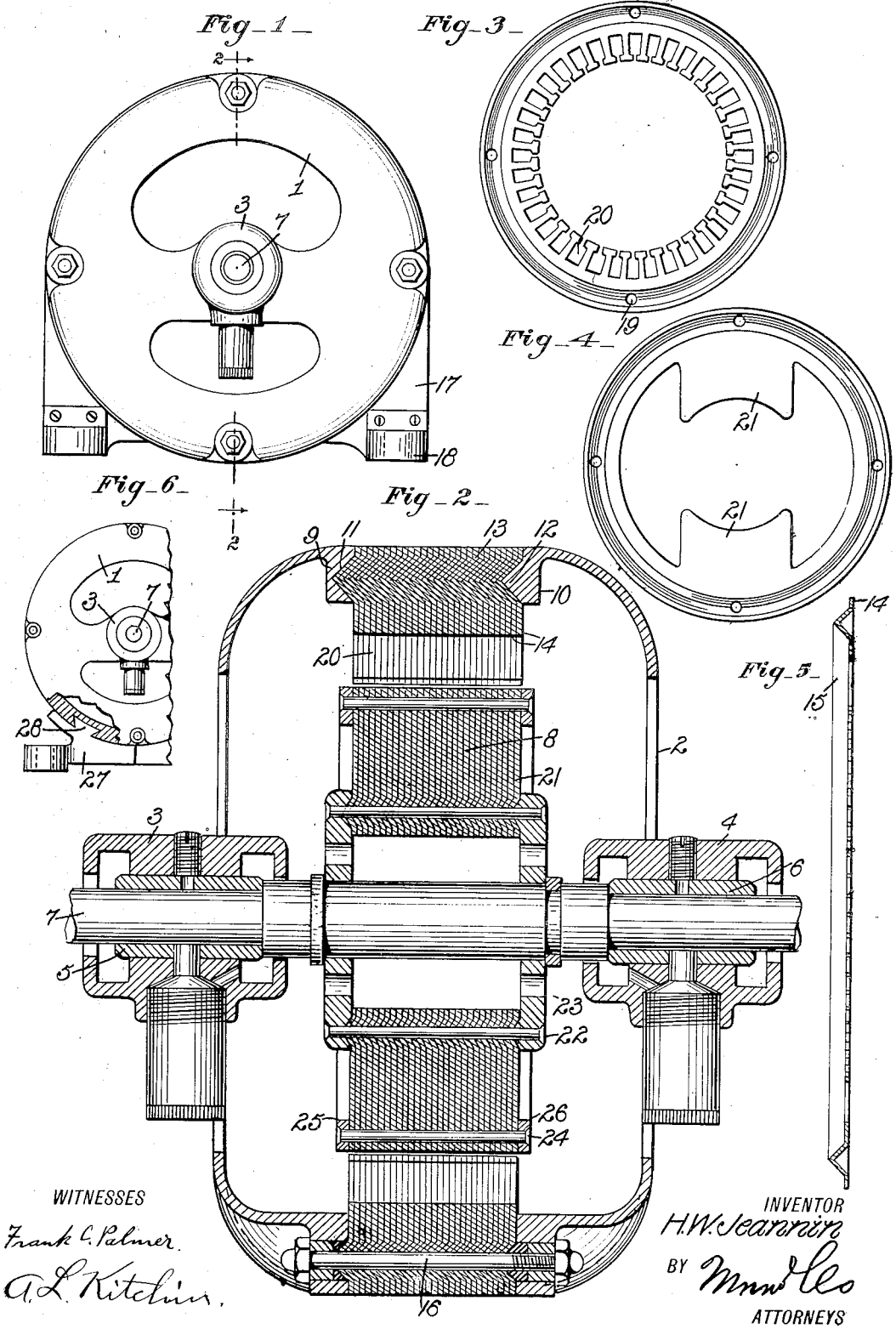

HARRY W. JEANNIN, OF WARREN, OHIO.

ELECTRIC MOTOR.

1,286,013.   Specification of Letters Patent.   Patented Nov. 26, 1918.

Application filed September 18, 1916. Serial No. 120,680.

*To all whom it may concern:*

Be it known that I, HARRY W. JEANNIN, a citizen of the United States, and a resident of Warren, in the county of Trumbull and State of Ohio, have invented a new and Improved Electric Motor, of which the following is a full, clear, and exact description.

This invention relates to electric motors and in particular to an improved construction of parts whereby the motor construction is simplified without injuriously affecting the efficiency.

The object in view is to provide an improved structure and also an arrangement of plates whereby the usual shell or frame is eliminated and the end plates are connected directly with the field.

Another object in view is to provide a field of laminated material with punched sections which act as means for holding the respective laminæ in proper position and also as means for connecting the fields with the end plates of the machine.

A still further object in view is to provide not only a field piece, which is connected with the end plates of the machine, but also an armature which is formed from laminæ having depressed grooves similar to the field for holding the parts in proper alinement.

In the accompanying drawings;

Figure 1 is a side view of a machine disclosing an embodiment of the invention;

Fig. 2 is a section of Fig. 1 on line 2—2, the same being on an enlarged scale;

Fig. 3 is a side view of the field disclosed in Fig. 2;

Fig. 4 is a side view of a field designed to be used with a direct current motor;

Fig. 5 is a section view through one of the laminations of the field shown in Fig. 2.

Fig. 6 is a fragmentary side view with certain parts broken away of a motor similar to that shown in Fig. 1, but much smaller and disclosing a modified form of support.

Referring to the accompanying drawings by numerals, 1 and 2 indicate end plates to which are secured the journal boxes 3 and 4, which journal boxes carry the brasses, or journal members 5 and 6, which in turn support the shaft 7. Shaft 7 extends through and is rigidly secured to the armature core 8 so that when the machine is in operation power may be transmitted to shaft 7 and thence to any suitable point.

The ends 1 and 2 are provided with annular inwardly extending flanges 9 and 10, flange 9 being provided with a groove 11, and flange 10 with a bead or ridge 12. Arranged between the ends 1 and 2 and fitting the flanges 9 and 10 is a field core 13, which field core is preferably formed from thin sheets of iron 14, said sheets being provided with annular beads 15 pressed from the sheets 14 so that when a number of beads are associated together they will produce field 13, the respective beads 15 fitting into each other as shown in Fig. 2, the bead of the sheet or lamina on one face of the field fitting groove 11 and the grooved face of the bead on the other side of the field fitting the bead 12 of end 2.

By this construction and arrangement the motor is properly formed without the ordinary shell or frame and the various parts of which the field core is made are rigidly held in place and in proper alinement. This is accomplished by the beads or punchings 15 and also by the provision of a number of clamping bolts 16 which extend through the flanges 9 and 10 at different points and also through the sheets or laminæ 14.

It will be observed that in forming the ends 1 and 2 part of the flanges 9 and 10 extend exteriorly in order to receive the bolt 16. When a large heavy motor is being made suitable exterior flanges or brackets 17 are produced, having feet whereby the parts may be clamped into a suitable base. The laminæ or sheets 14 are of course formed in the shape of a ring, as shown more particularly in Fig. 3, the same being provided with openings 19 for receiving the bolt 16 and various openings 20 for receiving the windings usually found in motors, the construction shown in Figs. 2 and 3 being adapted for use as alternating current motors. In case a direct current motor is desired the inner part of the field 13 is formed as shown in Fig. 4, namely, with the poles 21.

In addition to forming the outer part of the motor as hereinbefore described, the armature 8 is provided with sheets or laminæ 21, held in place by suitable bolts 22 and in proper alinement and interlocked condition by the pressed-out sections or beads 23. In addition to the bolts 22 a number of copper bars 24 are provided near the outer edge of the core 8, which bars are riveted into the copper clamping rings 25 and 26. It will be evident that the core may be supplied with any suitable kind of winding, the particular winding of the field 13 forming no part of the invention.

As shown in Fig. 1, extensions of the core 13 are formed into feet 18 for properly supporting the motor, but in case of small motors a different form of support may be provided, as for instance, a bracket 27 which has a dovetailed section 28 fitting into the dovetailed places punched out of the core 13. The dovetailed sections are just long enough to fit between the end plates 1 and 2 which hold the bracket 27 securely in place. The feet 18 are also provided with apertures for securing bolts or other securing means for holding the motor in position. These arrangements for holding the motor in position are desirable, but others may be produced without departing from the spirit of the invention and without in any way varying the use of the end plates 1 and 2 and the use of a particularly constructed field core similar to core 13 and an armature core 8.

In both the rotor and the stator the laminations are supported on side plates or members, without contact with the shaft in the case of the rotor or contact with a circumferential casing in case of the stator, as is common in dynamo electric machines, and yet the laminations are prevented from radial displacement because of their nesting relation. The bolts which pass through the supporting members and laminations are employed mainly to clamp the supporting members and laminations together, while the side members serve primarily as supports. The inner edges of the rotor laminations are spaced from the shaft and the outer edges of the stator laminations are exposed to the atmosphere, both of which features conduce to effective ventilation.

What I claim is;

The combination of a plurality of laminations each having an annular groove pressed out therein, whereby an annular ridge is formed on the side opposite from the groove, said laminations being arranged in contact with each other in side to side relation, with the ridge of one lamination fitting into the groove of the adjacent one, whereby the interfitting of the ridges and grooves prevents radial displacement of the laminations, and end clamping members for holding the laminations together, one member having an annular rib engaging in the annular groove of the lamination at one side and the other member having an annular groove to receive the annular ridge of the lamination at the other side.

HARRY W. JEANNIN.

Witnesses:
  D. W. HULL,
  R. B. WICK.